United States Patent
Matsuoka (10) Patent No.: US 8,402,367 B1
(45) Date of Patent: Mar. 19, 2013

(54) SMART RELOAD PAGES (75) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/297,757

(22) Filed: Nov. 16, 2011

(51) Int. Cl.
*G06F 17/00* (2006.01)

(52) U.S. Cl. ........................ 715/234; 709/203

(58) Field of Classification Search ............... 715/234
See application file for complete search history.

(56) References Cited

U.S. PATENT DOCUMENTS

| | | | |
|---|---|---|---|
| 7,685,536 B2 | 3/2010 | Hébert et al. | |
| 2008/0104256 A1 | 5/2008 | Olston | |
| 2008/0177994 A1* | 7/2008 | Mayer | 713/2 |
| 2009/0132949 A1* | 5/2009 | Bosarge | 715/777 |
| 2010/0011313 A1* | 1/2010 | Sauve et al. | 715/777 |
| 2010/0083179 A1* | 4/2010 | Decker et al. | 715/830 |
| 2010/0146067 A1* | 6/2010 | Tapuska et al. | 709/207 |
| 2011/0282978 A1* | 11/2011 | Paithankar | 709/221 |
| 2012/0059929 A1* | 3/2012 | Ramanathaiah et al. | 709/224 |
| 2012/0060083 A1* | 3/2012 | Yuan et al. | 715/234 |
| 2012/0092277 A1* | 4/2012 | Momchilov | 345/173 |

* cited by examiner

*Primary Examiner* — Doug Hutton, Jr.
*Assistant Examiner* — Zaida I Marrero
(74) *Attorney, Agent, or Firm* — Sterne, Kessler, Goldstein & Fox P.L.L.C.

(57) ABSTRACT

Methods and systems for reloading one or more browser tabs containing an incomplete display of web page are disclosed. A request is provided for one or more web pages for display in one or more browser tabs of a browser. There is a one to one mapping between the one or more web pages and the one or more browser tabs. Each browser tab is assigned a reload priority. The one or more requested web pages are received and loaded by the one or more browser tabs. One or more browser tabs containing an incomplete display of the one or more web pages is identified. The one or more browser tabs containing an incomplete display of a web page are reloaded based on the reload priority of the respective browser tab containing the incomplete display of the web page.

27 Claims, 7 Drawing Sheets

SMART RELOAD PAGES

BACKGROUND

1. Field

The field relates to browser web pages.

2. Background

A tabbed document interface (TDI) is one that allows multiple documents to be contained within a single window by utilizing tabs as a navigational widget for switching between sets of documents. It is most commonly associated with web browsers, web applications, and text editors. Browser tabs allow a user to view multiple web pages in the same browser without the need to open a new browser session.

In one example of using a tabbed document interface, a user may open a browser session to access a web page. While utilizing the same instance of the browser session, the user may want to open one or more additional web pages. By performing an "add tab" or "open new tab" function within the browser, the user may add one or more tabs to the browser. Each tab will load a web page specified by the user within the current browser session. The user will be able to view the web page for each tab by clicking on the respective tab.

More advanced tab features may include allowing users to perform any variety of functions including but not limited to, providing different display views for the information of each tab. For example, a browser may allow a user to hover over each tab, which may generate a thumbnail version of the website for quick viewing of the website's content.

When a user wants to open multiple web pages using tabs, the device processor and network connection can play a role. For example, when a user attempts to open multiple web pages at once using a TDI, a web page may fail to load due to a slow device processor or heavy network traffic. This often results in the display of an error message indicating the web page within the browser tab has failed to load. This detracts from the overall user experience.

BRIEF SUMMARY

One innovative aspect of the subject matter described in this specification is embodied in methods that include the steps of providing a request for one or more web pages for display in one or more browser tabs of a browser, wherein there is a one to one mapping between the one or more web pages and the one or more browser tabs, and further wherein each browser tab is assigned a reload priority, receiving the one or more web pages, loading the one or more web pages on the browser, identifying one or more browser tabs containing an incomplete display of the one or more web pages, determining a latency of a client device, and reloading the one or more browser tabs containing an incomplete display of a web page based on the reload priority of the respective browser tab containing the incomplete display of the web page and the latency of the client device.

Another innovative aspect of the subject matter described in this specification is embodied in systems comprising one or more computers and one or more storage devices storing instructions that are operable, when executed by the one or more computers, to cause the one or more computers to perform operations comprising providing a request for one or more web pages for display in one or more browser tabs of a browser, wherein there is a one to one mapping between the one or more web pages and the one or more browser tabs, and further wherein each browser tab is assigned a reload priority, receiving the one or more web pages, loading the one or more web pages on the browser, identifying one or more browser tabs containing an incomplete display of the one or more web pages, determining a latency of a client device, and reloading the one or more browser tabs containing an incomplete display of a web page based on the reload priority of the respective browser tab containing the incomplete display of the web page and the latency of the client device.

Another innovative aspect of the subject matter described in this specification is embodied in a non-transitory computer-readable medium storing software comprising instructions executable by one or more computers which, upon execution, cause the one or more computers to perform operations comprising providing a request for one or more web pages for display in one or more browser tabs of a browser, wherein there is a one to one mapping between the one or more web pages and the one or more browser tabs, and further wherein each browser tab is assigned a reload priority, receiving the one or more web pages, loading the one or more web pages on the browser, identifying one or more browser tabs containing an incomplete display of the one or more web pages, determining a latency of a client device, and reloading the one or more browser tabs containing an incomplete display of a web page based on the reload priority of the respective browser tab containing the incomplete display of the web page and the latency of the client device.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

A web browser is a software application or program designed to enable users to access, retrieve and view documents and other resources on the Internet. The principal purpose of a web browser is to bring information resources to a user. The process begins when a user inputs a Uniform Resource Locator (URL). A URL may be a specific character string that constitutes a reference to an information resource. The URL provides a means of locating the information resource by describing its primary access mechanism, such as the network location. Once the information resource has been retrieved, the web browser will display it. A web browser can generally display any kind of content that can be part of a web page. A browser can display images, audio, and video, in addition to providing plug-ins to support other applications.

In general, a web page is a simple text file that contains text and a set of HTML tags that describe how the text should be formatted when a browser displays it on the screen. HTML tags are simple instructions that tell the browser how the web page should be displayed. For example, the tags contain instructions that control the font, alignment and size of content of a web page. Upon a user request to load a web page, a web browser interprets the set of HTML tags within the web page and displays the web page accordingly.

A key factor to the overall user experience of using a web browser is the ability of the browser to load web pages completely and quickly. Elements that may affect the accuracy and speed of loading a web page include the overall latency of a client device which the browser resides upon. Specifically when loading multiple web pages or web pages with a high volume of content, the latency may have an adverse impact upon the user experience. For example, a slow processor of a client device or a high network latency may cause a web page to not load completely. That is, the complete contents of the web page will not be transferred over the network when requested. This can result in the generation of an error message indicating that the web page has failed to load. Often, a user will have to wait for improved network latency or the freeing up of processes on the processor of the client device, and then manually request a reload of the web page that failed.

Embodiments described herein refer to illustrations for particular application. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
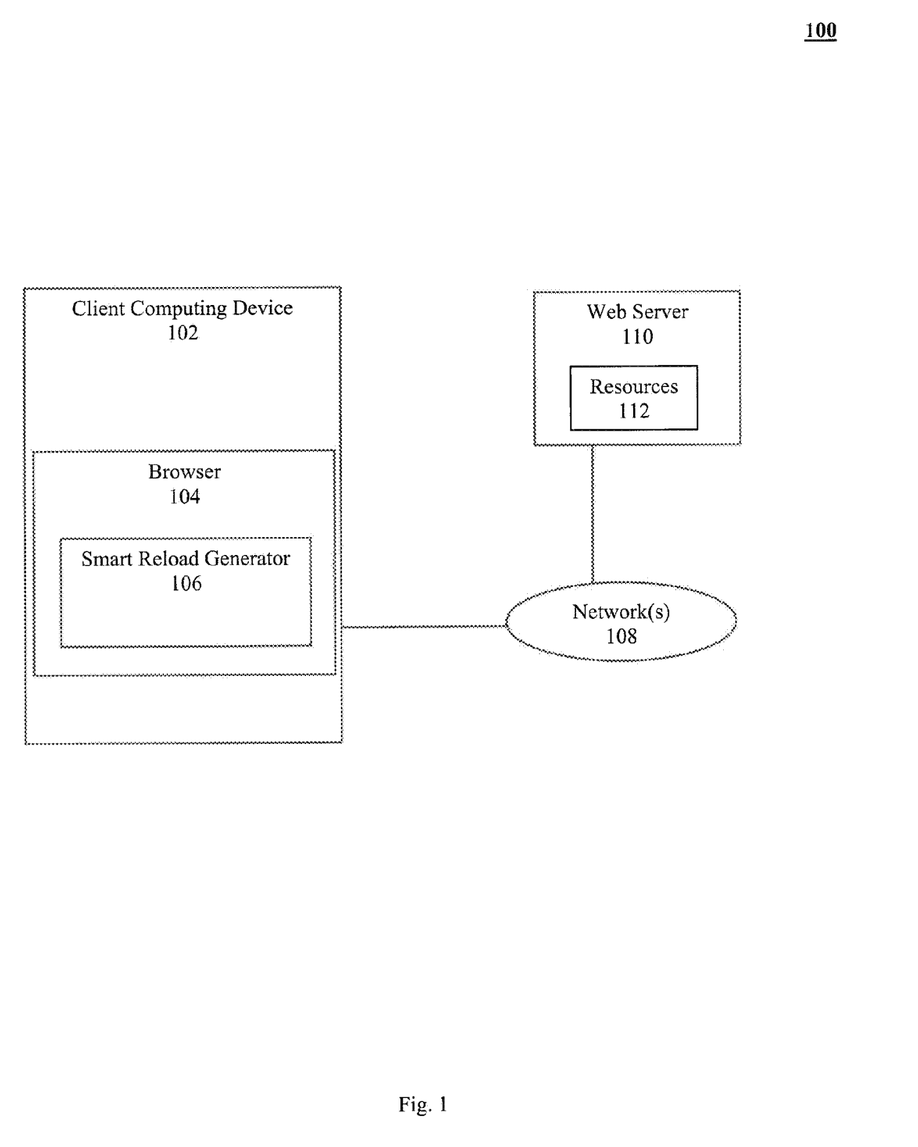
FIG. 1 is a diagram illustrating an exemplary system, according to an embodiment.

FIG. 1 is a block diagram illustrating a smart reload system 100 for reloading web pages. Smart reload system 100 includes a web server 110, and a client computing device 102 coupled via one or more networks 108, such as the Internet or local area network. Client computing device 102 includes a browser 104 and smart reload generator 106.

In general, smart reload system 100 operates as follows. A request for one or more web pages is made by browser 104. The one or more web pages may be displayed in one or more browser tabs of browser 104. A one to one mapping may exist between the one or more web pages and the one or more browser tabs. Smart reload generator 106 assigns a reload priority to each of the one or more browser tabs. For example, the reload priority may be assigned based on the left to right display of the one or more browser tabs within browser 104, with the left most browser tab having the highest reload priority. In response to the request for one or more web pages for display, browser 104 on client computing device 102 receives and loads one or more web pages from resource database 112 on web server 110.

Smart reload generator 106 identifies one or more browser tabs containing an incomplete display of the one or more web pages on browser 104. An incomplete display indicates that all of the contents of the requested web page have not been received by browser 104. Smart reload generator 106 determines a latency of client computing device 102. In an embodiment, the latency of client computing device 102 can be the measure of time delay of loading the one or more web pages. The time delay of loading the one or more web pages can be measured by measuring the elapsed time between a web page request and the receipt of the web page contents for display. A low latency indicates that the website contents from resource database 112 is provided over a short duration of time. A high latency indicates that the website contents from resource database 112 is provided over a long duration of time.

Browser 104 can be configured to have a web page timeout threshold, according to an embodiment. For each request for the one or more web pages for display, the transfer of data associated with each web page will take place for a time period up to the web page timeout threshold. When the web page timeout threshold has been reached, if the web page data has not been completely transferred to browser 104 for display, a web page timeout may be generated by browser 104. In an embodiment, a high latency of client computing device 102 may generate a web page timeout by browser 104.

Smart reload generator 106 reloads the one or more browser tabs containing an incomplete display of a web page based on the reload priority of the respective browser tab containing the incomplete display of the web page and the latency of the client computing device. For example, once the latency of client computing device 102 is determined to be below the webpage timeout threshold, smart reload generator 106 can traverse through each of the browser tabs containing an incomplete display of a web page and perform a reload of the web page. The traversal of the browser tabs can be based on the reload priority, with the browser tab having the highest reload priority being reloaded first. A reload of the web page includes making another request of web server 112 for the contents of the web page from resource database 112.

Network 108 may be any network or combination of networks that can carry data communications. Such a network 108 may include, but is not limited to, a local area network, metropolitan area network, and/or wide area network such as the Internet. Network 108 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web Server 110 is a computing device or an application executing on a computing device that hosts resource database 112. Resource database 110 may store data associated with a domain name. Resource database 112 can be hosted by one or more servers 108. Web Server 108 delivers data within resource database 112 to client computing device 102.

Resource database 110 can store any data that can be provided over network 108. The data stored in resource database 112 may be identified by a resource address that is associated with each domain name. The data within resource database 112 may include, for example, hypertext markup language (HTML) pages, word processing documents, portable document format (PDF) documents, images, video, and feed sources. The data in resource database 112 can include content, such as words, phrases, images and sounds, that may include embedded information (such as meta-information in hyperlinks) and/or embedded instructions (such as JavaScript scripts).

Client computing device 102 is a processor-based electronic device that is manipulated by a user and is capable of requesting and receiving data within resource database 112 over network 108. Examples of client computing device 102 may include personal computers, mobile communication devices and tablet computers. Client computing device 102 typically includes an application, such as browser 104. A user may utilize browser 104 to request data within resource database 110, such as HTML pages over network 108. For example, a user requests data within resource database 110 by typing the resource address associated with that data. In response to the request, web server 110 delivers data within resource database 112 to client computing device 102. When client computing device 102 receives data within resource database 112 from web server 110, client computing device 106 uses browser 104 to display the data to the user.

Browser 104 may be any kind of browser. Browser 104 may also include a smart reload generator 106. Smart reload generator 106 may extend the functionality of browser 104 and can be configured to reload one or more browser tabs containing an incomplete display of a web page. For example, smart reload generator 106 may be a browser extension downloaded from web server 108 and installed on client computing device 102 as part of browser 104. Smart reload generator 106 may be developed by an application developer on client computing device 102 or any other computing device. A programming language, such as JavaScript may be used to develop smart reload generator 106 on client computing device 102. Smart reload generator 106 may then be stored locally on client computing device 102. Alternatively, smart reload generator 106 may be uploaded to a smart reload server (not shown). Smart reload server may distribute smart reload generator 106 to additional client computing devices due to a request from a user.

Figure 2:
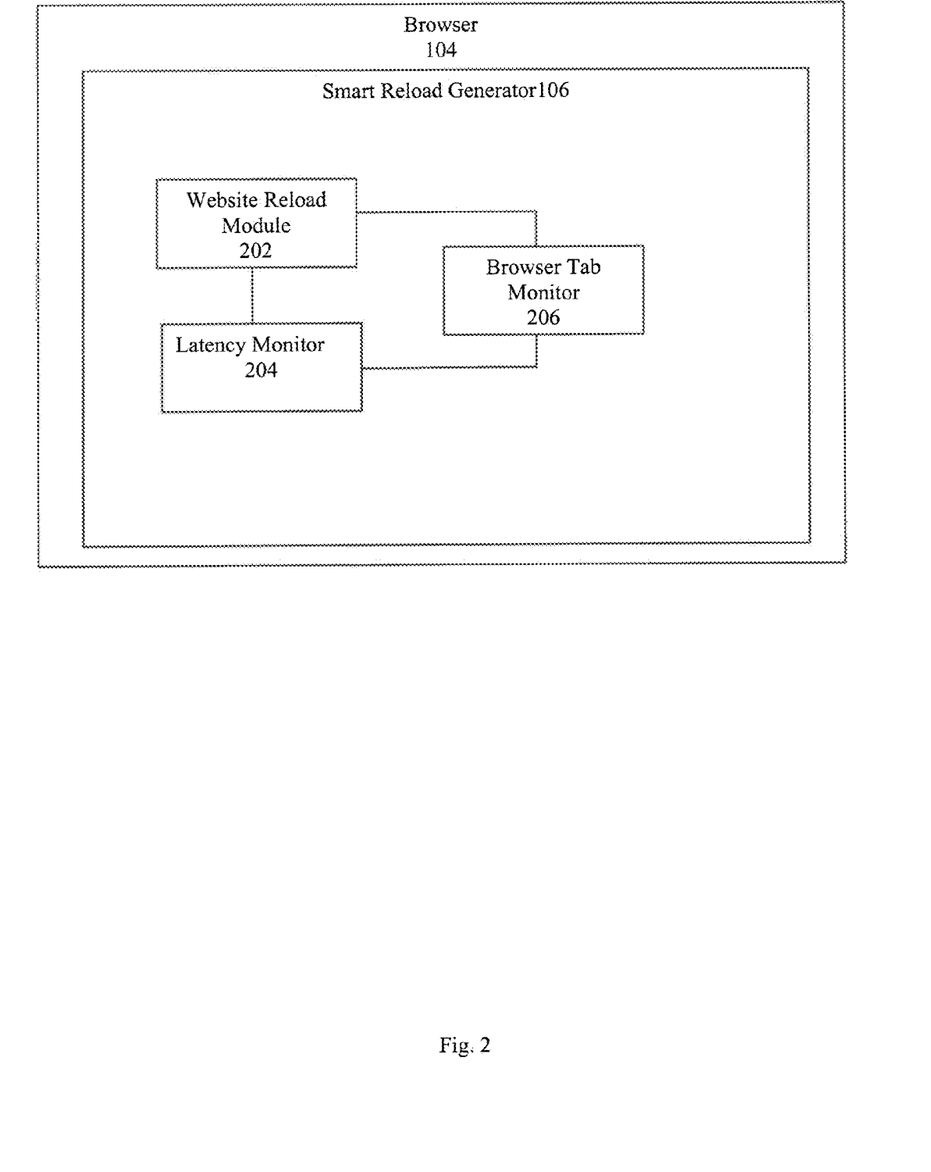
FIG. 2 is an illustration of a smart reload system, according to an embodiment.

FIG. 2 is an illustration of a smart reload generator, according to an embodiment. Smart reload generator 106 includes website reload module 202, latency monitor 204, and browser tab monitor 206. Smart reload generator 106 may be configured to reload one or more browser tabs containing an incomplete display of a web page.

Smart reload generator 106, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

In operation, browser 104 can request one or more web pages for display on one or more browser tabs. The one or more web pages may be provided by web server 110, which retrieves the content from resource database 112. In an embodiment, browser 104 can be configured to receive and load the one or more web pages. Each web page may be associated with one or more files which define how the web page is displayed. Each file is transferred from resource database 112 of web server 110 to browser 104.

Figure 4A:
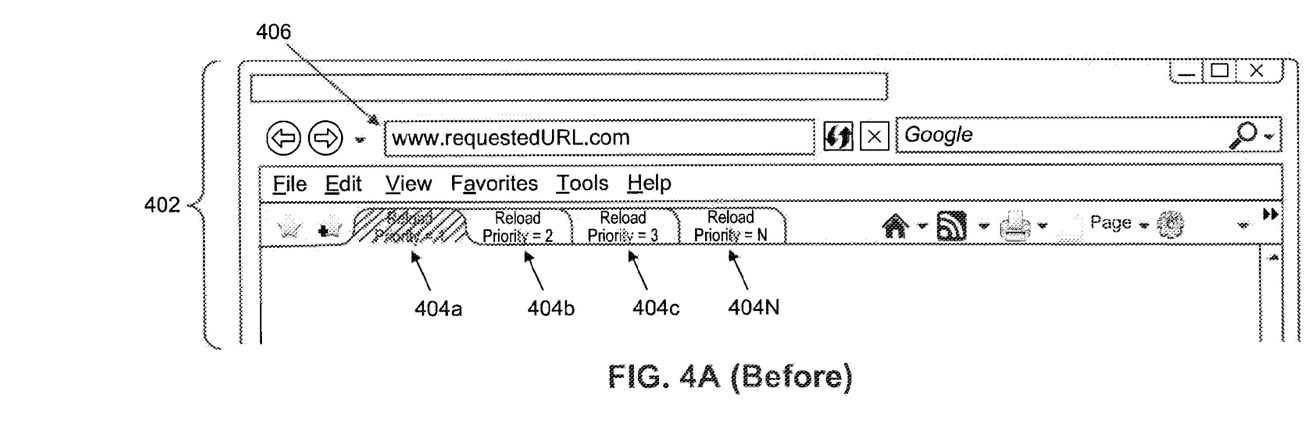
FIG. 4A and FIG. 4B illustrate an example display view (before and after) of assigning a reload priority, according to an embodiment.
Figure 4B:
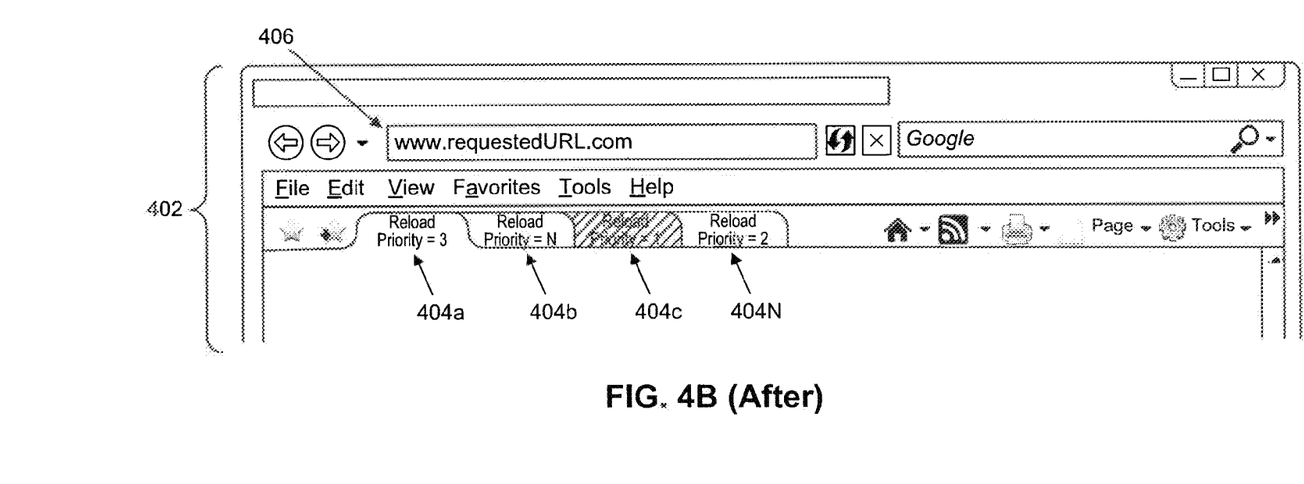

In an embodiment, website reload module 202 may assign a reload priority to each browser tab of browser 104. A reload priority determines the order in which browser tabs are loaded with a web page, according to an embodiment. FIG. 4A and FIG. 4B illustrate an example display view (before and after) of assigning a reload priority, according to an embodiment.

In an embodiment, each browser tab 404A, 404B, 404C . . . 404N of browser 104 is assigned a reload priority by website reload module 202. For example, each of the browser tabs 404A, 404B, 404C . . . 404N may be assigned a reload priority of 1, 2, 3 . . . N respectively. Website reload module 202 may assign browser tab 404A a reload priority of 1, which indicates that browser tab 404A is the first browser tab to be loaded with a web page. Website reload module 202 may assign browser tab 404B a reload priority of 2, which indicates that browser tab 404B is the second browser tab to be loaded with the page. The reload priority scheme continues for all browser tabs 404A, 404B, 404C . . . 404N within browser 402. In an embodiment, the reload priority of browser tabs 404A, 404B, 404C . . . 404N of browser 104 may be assigned a reload priority based on the left to right display of browser tabs 404A, 404B, 404C . . . 404N, as described in the example above. Although, a reload priority scheme based on the left to right display of browser tabs 404A, 404A, 404B, 404C . . . 404N is used in examples, it is known to a person skilled in the relevant art, that other reload priority schemes may be used. For example, a reload priority may be based on the most used websites of the user or the overall size of the website. For instance, a browser tab with a website that is requested often, may be assigned a higher reload priority than a browser tab with a webpage requested less often.

In an embodiment, the reload priority of browser tabs 404A, 404B, 404C . . . 404N of browser 104 may be updated dynamically based on a currently viewed browser tab, as illustrated by FIG. 4B. For example, a user may select browser tab 404C as the active and currently viewed website. Website reload module 202 can update the reload priority of browser tab 404C and assign a reload priority of 1. The reload priority of the remaining browser tabs 404A, 404B, 404C . . . 404N of browser 104 may be updated dynamically based on the newly assigned reload priority to browser tab 404C. Although, the assignment of a reload priority for browser tabs 404A, 404B, 404C . . . 404N is based on the left to right display of the browser tabs within the browser as described in embodiments, it is understood that other reload priority assignment schemes may be used. For example, the reload priority may be assigned randomly or the user may define the reload priority for each of the browser tabs.

Returning to FIG. 2, according to an embodiment, browser tab monitor 206 may identify one or more browser tabs containing an incomplete display of the one more web pages. For example, upon a request to load the one or more web pages, all of the files associated with one or more of the web pages may not be completely transferred from web server 110 to browser 104 over network 108. As a result, the one or more web pages with an incomplete transfer of all of its files cannot be displayed. Browser tab monitor 206 can be configured to set a web page timeout threshold, according to an embodiment.

For each request for the one or more web pages for display, the transfer of the files associated with each web page will take place for a time period up to the web page timeout threshold. When the web page timeout threshold has been reached, if the files associated with the web page have not been completely transferred to browser 104 for display, a web page timeout can be generated by browser tab monitor 206. In an embodiment, browser tab monitor 206 may generate a web page timeout for each of one or more browser tabs of browser 104. A web page timeout closes a network connection between browser 104 and web server 110.

In one implementation, latency monitor 204 can determine a latency of client computing device 102. In an embodiment, the latency of client computing device 102 can be the measure of time delay of loading the one or more web pages. The time delay of loading the one or more web pages can be measured by measuring the elapsed time between a web page request and the receipt of the web page contents for display, according to an embodiment. For example, browser 104 can make a request for one or more web pages from web server 110. The total time it takes web server 110 to retrieve the website contents from resource database 112 and provide it to browser 104 is the latency of client computing device 102. As discussed previously, a high latency indicates that the website contents from resource database 112 is provided to browser 104 over a long duration of time, which may generate a web page timeout.

In one implementation, website reload module 202 can reload one or more browser tabs containing an incomplete display of a web page based on the reload priority of the respective browser tab containing the incomplete display of the web page and the latency of the client computing device 102. For example, once a web page timeout is generated by browser 104, website reload module 202 can reload the one or more browser tabs of browser 104 once latency monitor 204 determines that the latency of client computing device 102 is below the web page timeout threshold. A latency of client computing device 102 which is below the web page timeout threshold is an indication that a request for a web page may be satisfied without the generation of a web page timeout.

Website reload module 202 can traverse each of the one or more browser tabs of browser 104 containing an incomplete display of a web page based on its respective reload priority and perform another request for the web page from web server 110. In an embodiment, website reload module 202 automatically traverses the one or more browser tabs of browser 104 containing an incomplete display of a web page and performs another request for the web page. In another embodiment, the user may configure website reload module 202 to perform another reload of the web pages for the one or more browser tabs of browser 104 containing an incomplete display based on a periodic.

Figure 3:
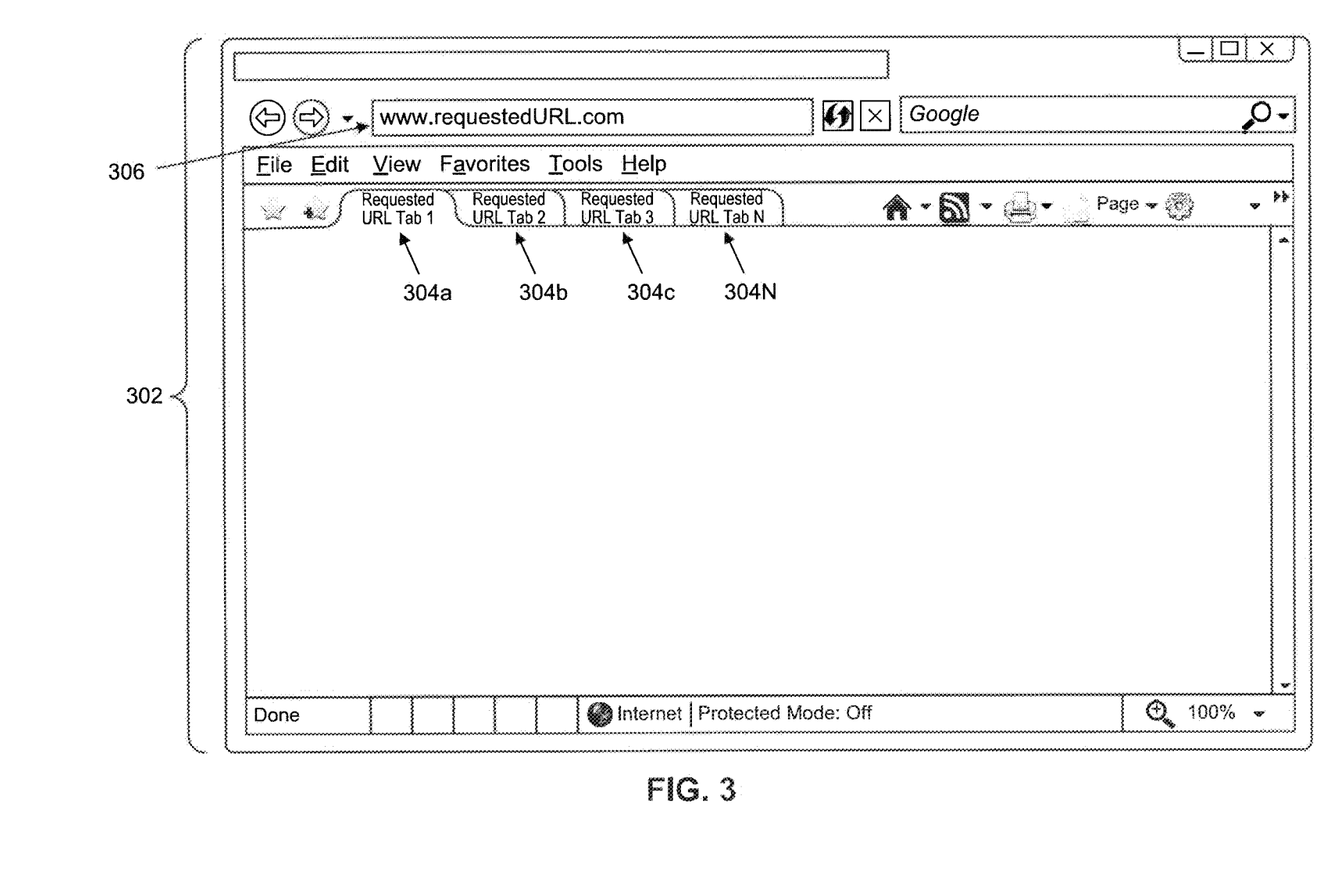
FIG. 3 is an illustration of an example display view of smart reload system, according to an embodiment.

FIG. 3 is an illustration of an example display view of smart reload system, according to an embodiment. FIG. 3 includes browser 302, one or more browser tabs 304A, 304B, 304C ... 304N and web address bar 306.

In operation, browser 302 can request one or more web pages for display on one or more browser tabs 304A, 304B, 304C ... 304N. The one or more web pages may be provided by resource database 112 of web server 110. A user may type a URL in web address bar 306 for each browser tab 304A, 304B, 304C, 304N. The URL specifies the location of the requested web page within resource database 112, according to an embodiment.

In an embodiment, there is a one to one mapping between the one or more web pages and the one or more browser tabs. For example, the user may utilize browser 302 to generate 1 ... N browser tabs, which can display 1 ... N web pages. For each browser tab 304A, 304B, 304C ... 304N, the user may type a different URL corresponding to a web page. Alternatively, according to an embodiment a user may configure browser 302 to request a set of web pages upon startup of browser 302, utilizing browser tabs 304A, 304B, 304C, 304D for display. For example, browser 302 may be configured to request 1 ... N different web pages from web server 110 each time browser 302 is executed. Browser 302 sends a request to web server 110 for the one or more web pages. Web server 110 receives the request and retrieves the data associated with the one or more web pages from resource database 112.

In an embodiment, browser 302 can be configured to receive and load the one or more web pages. For example, once web server 110 provides the content of the requested web pages from resource database 112, browser 302 will load each web page on a different browser tab 304A, 304B, 304C ... 304N. Each web page may be associated with one or more files which define how the web page is displayed. Each file is transferred from resource database 112 of web server 110 to browser 302. Upon completion of the file transfer for each browser tab 304A, 304B, 304C ... 304N, each browser tab 304A, 304B, 304C ... 304N reads and interprets their respective files and displays the website accordingly.

In one implementation, browser 302 can be configured to assign a reload priority to each of the one or more browser tabs 304A, 304B, 304C ... 304N. For example, browser tabs 304A, 304B, 304C ... 304N may be assigned a reload priority using the left to right ordering scheme described previously. Browser tab 304A may be assigned a reload priority of 1 with all subsequent browser tabs assigned a reload priority in ascending order based on the left to right display of the browser tabs 304A, 304B, 304C ... 304N. In an embodiment, the reload priority of browser tabs 304A, 304B, 304C ... 304N may be updated dynamically based on the active browser tab being viewed by the user. Upon selection of a new browser tab by a user, a new reload priority for each of the browser tabs 304A, 304B, 304C ... 304N may be assigned.

In one embodiment, browser 302 may identify one or more browser tabs containing an incomplete display of the one more web pages. For example, upon a request to load the one or more web pages for display on each browser tab 304A, 304B, 304C ... 304N, all of the files associated with one or more of the web pages may not be completely transferred from web server 110 to browser 302. As a result, the one or more web pages with an incomplete transfer of all of its files cannot be displayed on browser tabs 304A, 304B, 304C ... 304N. In an embodiment, browser 302 can be configured to have a web page timeout threshold. For each request for the one or more web pages for display on browser tabs 304A, 304B, 304C ... 304N, the transfer of the files associated with each web page will take place for a time period up to the web page timeout threshold. When the web page timeout threshold has been reached, if the files associated with the web page have not been completely transferred to browser 302 for display on browser tabs 304A, 304B, 304C ... 304N, a web page timeout can be generated by browser 302.

Figure 5:
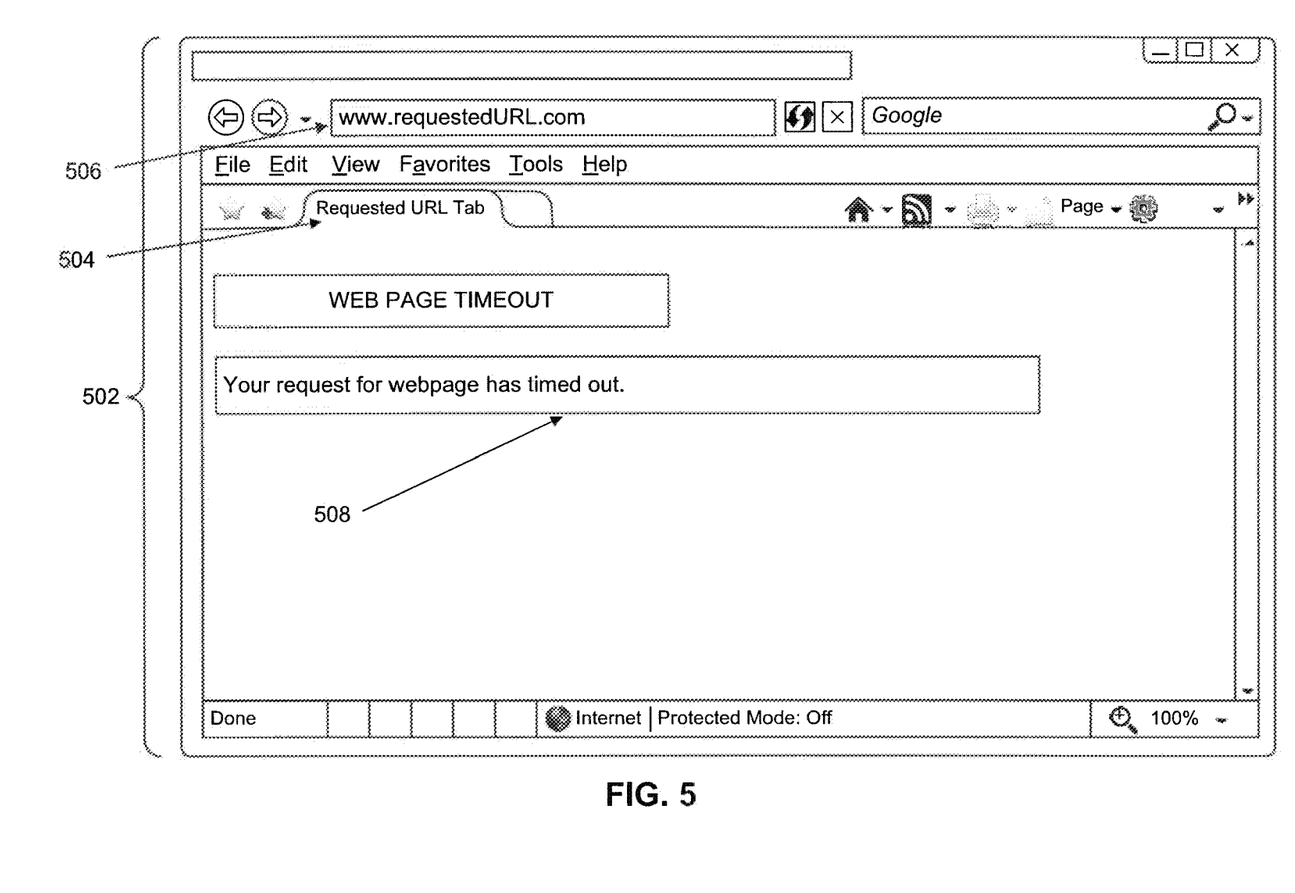
FIG. 5 is another illustration of an example display view of smart reload system, according to an embodiment.

In an embodiment, browser 302 may generate a web page timeout for each of one or more browser tabs 304A, 304B, 304C ... 304N. A web page timeout closes a network connection between browser 302 and web server 110. In another embodiment, the one or more browser tabs 304A, 304B, 304C ... 304N which have a timeout may display an error notification. For example, an error notification is displayed notifying the user that a web page timeout has been generated and the web page did not loaded properly. FIG. 5 illustrates a display view of smart reload system displaying an error notification 508 in response to a web page timeout.

In one implementation, browser 302 can determine a latency of client computing device 102. In an embodiment, the latency of client device 102 can be the measure of time delay of loading the one or more web pages. The time delay of loading the one or more web pages can be determined by measuring the elapsed time between a web page request and the receipt of the web page contents for display. For example, each of the one or more browser tabs 304A, 304B, 304C . . . 304N can make a request for one or more web pages from web server 110. The total time it takes web server 110 to retrieve the website contents from resource database 112 and provide it to each of the browser tabs 304A, 304B, 304C . . . 304N is the latency of client device 102.

In general, a low latency indicates that the website contents from resource database 112 is provided to browser tabs 304A, 304B, 304C . . . 304N over a short duration of time. A high latency indicates that the website contents from resource database 112 is provided to browser tabs 304A, 304B, 304C . . . 304N over a long duration of time. In an embodiment, a high latency may generate a web page timeout. For example, a high latency can cause the web page timeout threshold to be met for one or more browser tabs 304A, 304B, 304C . . . 304N. Since a high latency indicates a longer time to provide the web page contents to browser tabs 304A, 304B, 304C . . . 304N, if the latency time is equal to or greater than the web page timeout threshold, a web page time out can be generated by browser 302.

In an embodiment, browser 302 can reload one or more browser tabs 304A, 304B, 304C . . . 304N containing an incomplete display of a web page based on the reload priority of the respective browser tab containing the incomplete display of the web page and the latency of the client device. For example, once a web page timeout is generated by browser 302 for one or more of the browser tabs 304A, 304B, 304C . . . 304N, browser 302 can reload the one or more browser tabs 304A, 304B, 304C . . . 304N with a web page timeout once it is determined that the latency of client computing device 102 is below the web page timeout threshold.

In one implementation, browser 302 can navigate through each of the one or more browser tabs 304A, 304B, 304C . . . 304N containing an incomplete display of a web page based on its respective reload priority and perform another request for the web page. In an embodiment, browser 302 automatically traverses the one or more browser tabs 304A, 304B, 304C . . . 304N containing an incomplete display of a web page and performs another request. In another embodiment, the user may configure browser 302 to perform another reload of the web pages for the one or more browser tabs 304A, 304B, 304C . . . 304N containing an incomplete display based on a periodic. For example, browser 302 may perform a reload of the one or more browser tabs 304A, 304B, 304C . . . 304N containing an incomplete display every 20 seconds.

Figure 6:
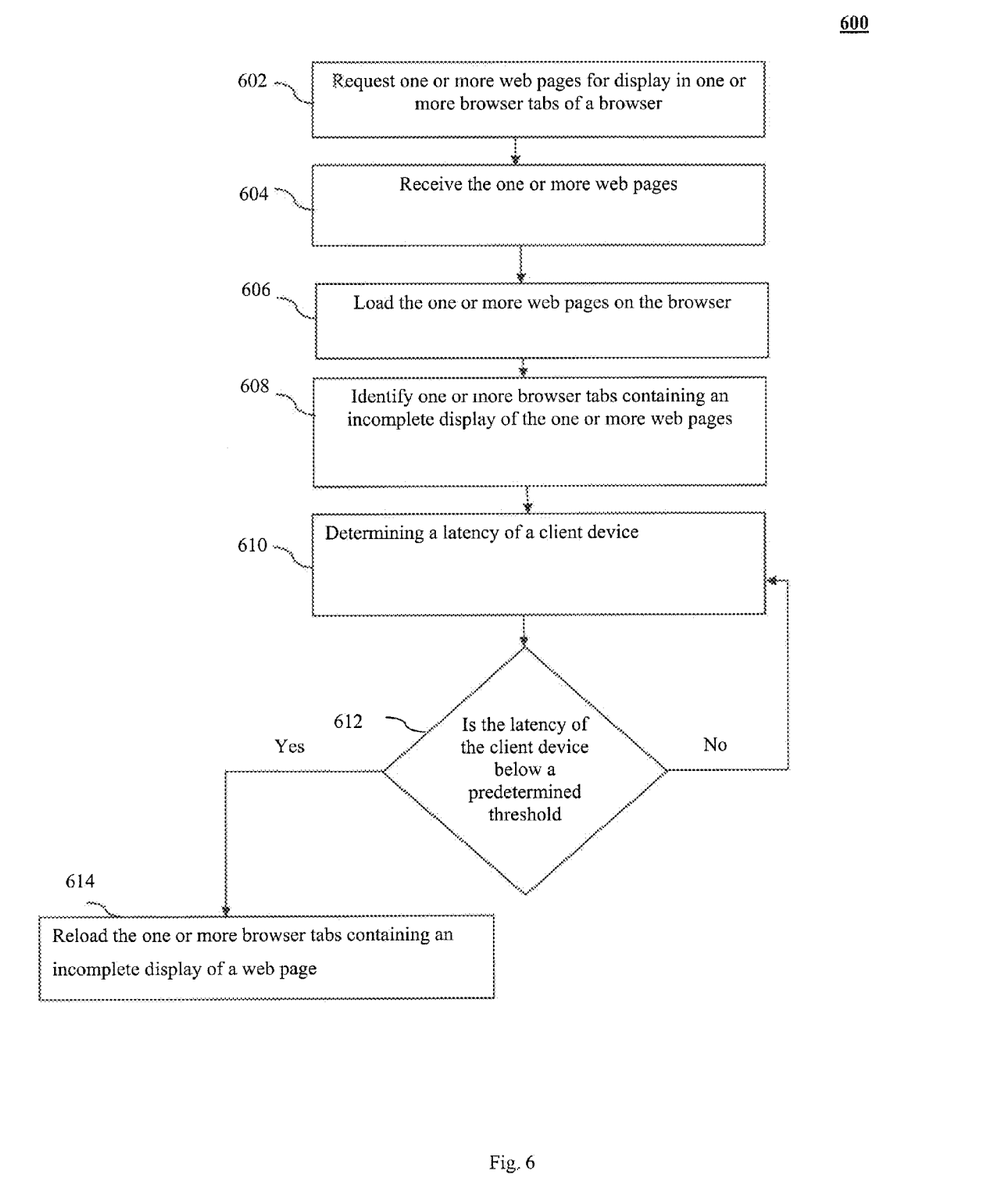
FIG. 6 is a flow diagram of an example method for performing a smart reload operation.

FIG. 6 is a flow diagram of an example method 600 for performing a smart reload operation.

In stage 602, a request for one or more web pages for display in one or more browser tabs is provided. For example, a request for one or more web pages for display in one or more browser tabs 304A, 304B, 304C . . . 304N is provided to browser 302 on client computing device 102. For instance, upon a user typing in a URL in web address bar 306 of browser 302, a request for the web page associated with the URL is sent to web server 110. The user may click on each browser tab 304A, 304B, 304C . . . 304N and enter a different URL in web address bar 306. Each time a URL is entered for the one or more browser tabs 304A, 304B, 304C . . . 304N, a request for web server 110 to provide the web page for display is made. In an embodiment, the user may configure browser 104 to load a predefined set of web pages for display in the one or more browser tabs 304A, 304B, 304C . . . 304N. For example, upon execution and startup of browser 302, a request for one or more web pages for display in browser tab 304A, 304B, 304C . . . 304N is generated automatically. The set of web pages may correspond to the most visited or favorite web sites of the user, for example.

In an embodiment, the one or more browser tabs 304A, 304B, 304C . . . 304N can be assigned a reload priority. The reload priority determines the order that a website is loaded in its respective browser tab. A higher assigned reload priority indicates that the associated browser tab can load a website first. The reload priority can be based on the left to right display of the one or more browser tabs 304A, 304B, 304C . . . 304N on browser 302, according to an embodiment. In another embodiment, the reload priority for each of the one or more browser tabs 304A, 304B, 304C . . . 304N can be updated dynamically based on which browser tab is the active browser tab. The active browser tab is the browser tab which contains the website that the user is currently viewing. When the user changes the active browser tab, the reload priority for each of the one or more web browser 304A, 3045, 304C . . . 304N will change, with the active browser tab having the highest reload priority. The subsequent browser tabs can have a new reload priority assigned based on the left to right ordering scheme described above.

In stage 604, the one or more web pages is received. For example, the one or more web pages is received by browser 302 on client computing device 102. For instance, after the request for one or more web pages for display in one or more browser tabs 304A, 304B, 304C . . . 304N is made, web server 110 searches and retrieves the content from resource database 112. The content consists of one or more files that specify how the web page will appear when displayed. The one or more files are sent to browser 302 over network 108.

In stage 606, the one or more web pages is loaded. For example, the one or more web pages is loaded by browser 302 on client computing device 102. For instance, upon receipt of the one or more files associated with each web page request, browser 302 reads and interprets each of the one or more files. The one or more web pages can then be displayed in the one or more browser tabs 304A, 304B, 304C . . . 304N.

In stage 608, one or more browser tabs containing an incomplete display of the one or more web pages are identified. For example, the one or more browser tabs 304A, 304B, 304C . . . 304N containing an incomplete display of the one or more web pages are identified by smart reload generator 106 of browser 302. For instance, during the loading of the one or more web pages on browser 302, all of the files associated with a particular web page may not be transferred completely. The files may not be transferred due to a high latency of client computing device 102, as discussed previously. Due to the incomplete transfer of the one or more files associated with a web page, the web page will fail to display properly in the browser tabs 304A, 304B, 304C . . . 304N. In an embodiment, browser 302 will set a web page timeout threshold for the loading of each of the web pages. If the time to load a web page surpasses the web page timeout threshold, a web page timeout will be generated by smart reload generator 106. The attempt to load the web page will stop and an error message can be generated to inform the user that the web page failed to load.

In stage 610, the latency of a client device is determined. For example, the latency of client computing device 102 can be determined by smart reload generator 106 of browser 302.

For instance, the latency of client computing device can be monitored to determine how fast a request for a web page is satisfied. In an embodiment, the latency is a measure of time delay of loading the one or more web pages requested. The time delay can be the elapsed time from when a request for a web page is made by the user and when the web page is displayed to the user. In other words, the time it takes for web server 110 to retrieve the content from resource database 112 and return it to browser 104 for display.

In stage 612, it is determined whether the latency of the client device is below a web page timeout threshold. For example, this determination is performed by smart reload generator 106 of browser 302. For instance, a web page timeout threshold can be the duration of time that browser 302 will request a particular web page before generating a web page timeout. An example web page timeout threshold can be 10 seconds. If the latency of the client computing device 102 is below 10 seconds, this is an indication that a web page request may be properly satisfied and will load and display correctly. If the latency of client computing device 102 is below the web page timeout threshold, then method 600 proceeds to step 614. If the latency of client computing device 102 is above the web page timeout threshold, steps 610 and 612 will be repeated until the latency is determined to be below the web page timeout threshold. For example, latency monitor 204 and website reload module 202 of smart reload generator 106 can be configured to continuously check the latency of client computing device 102 until the latency is below the web page time threshold.

In stage 614, one or more browser tabs containing an incomplete display of the one or more web pages are reloaded. For example, the one or more browser tabs 304A, 304B, 304C . . . 304N containing an incomplete display of the one or more web pages are reloaded by website reload module 202 of smart reload generator 106. According to an embodiment the one or more browser tabs containing an incomplete display of the one or more web pages are reloaded based on the reload priority of the respective browser tab containing the incomplete display of the web page and the latency of the client device. For example, once the latency of client computing device 102 is determined to be below the web page timeout threshold, each of the browser tabs with an incomplete display of a web page may be automatically reloaded. A reload is the submission of another request for the web page from web server 110. The browser tabs can be reloaded based on the assigned reload priority discussed previously.

Figure 7:
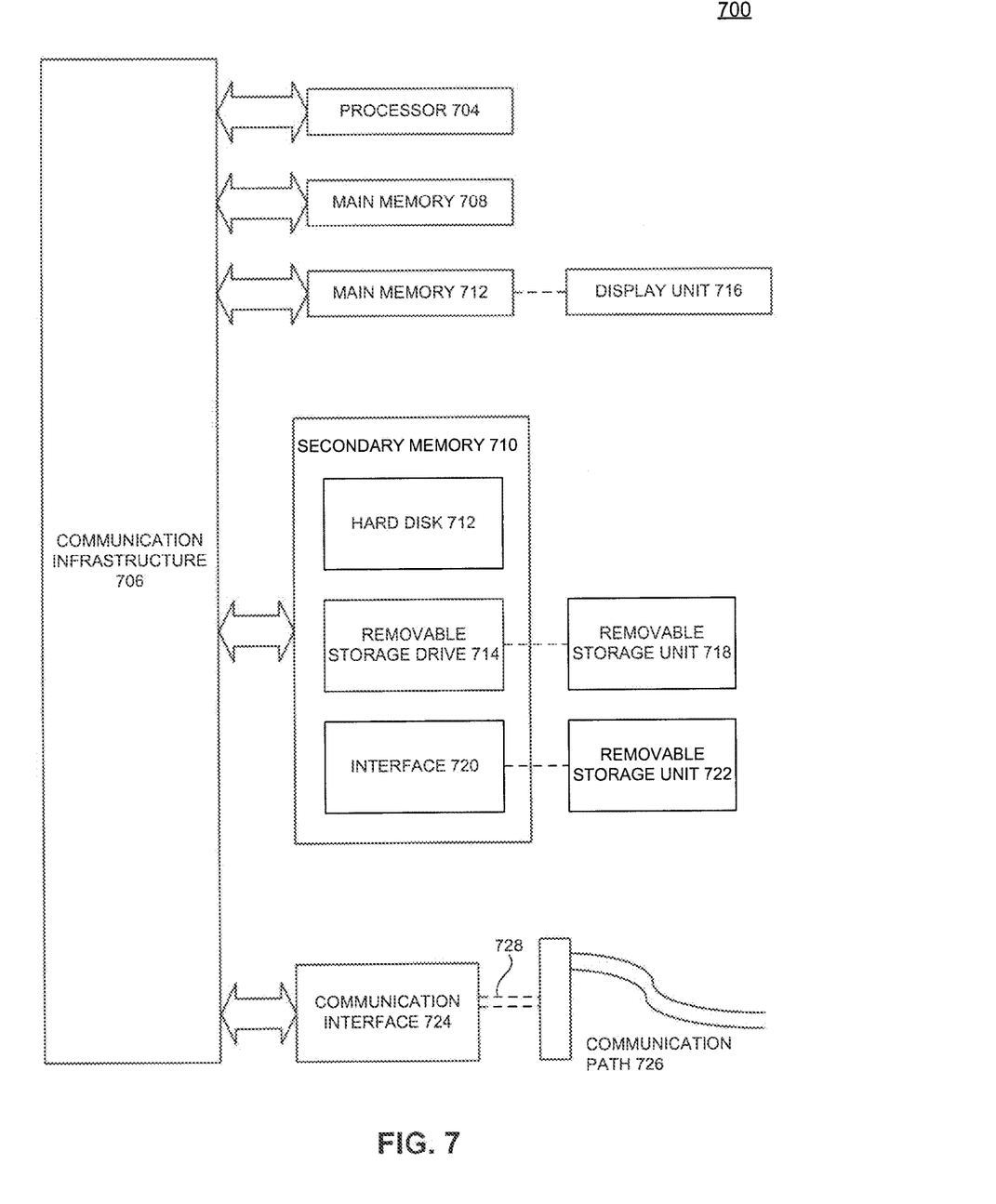
FIG. 7 is a diagram of a system that may be used to implement embodiments disclosed herein.

Various aspects of the present invention can be implemented by software, firmware, hardware, or a combination thereof. FIG. 7 illustrates an example computer system 700 in which the embodiments, or portions thereof, can be implemented as computer-readable code. For example, smart reload system 100 carrying our method 600 of FIG. 6 can be implemented in system 700. Various embodiments of the invention are described in terms of this example computer system 700.

Computer system 700 includes one or more processors, such as processor 704. Processor can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive and/or a removable storage drive. Removable storage drive 714 may include a floppy disk drive, a magnetic tape drive, an optical disk drive, a flash memory, or the like. The removable storage drive 614 reads from and/or writes to removable storage unit 718 in a well-known manner. Removable storage unit 718 may include a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 620 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the term "computer readable storage medium" is used to generally refer to media such as removable storage unit 718, removable storage unit 722, and a hard disk installed in hard disk drive 712. Computer readable storage medium can also refer to one or more memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the embodiments as discussed herein. In particular, the computer programs, when executed, enable processor 704 to implement the processes of embodiments of the present invention, such as the steps in the methods discussed above. Accordingly, such computer programs represent controllers of the computer system 700. Where embodiments are implemented using software, the software may be stored in a computer program product and loaded into computer system 700 using removable storage drive 714, interface 720, or hard drive 712.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer implemented method, comprising:
   providing, from a client device, a request for content of one or more web pages for display in one or more browser tabs of a browser at the client device, wherein each browser tab is associated with a respective web page;
   assigning a reload priority for each browser tab in response to the request for content of the respective web page;
   receiving the content of one or more web pages;
   loading the content of the one or more web pages on the browser;
   identifying, at the client device, one or more browser tabs containing an incomplete display of the one or more web pages;
   determining a reload order of the one or more browser tabs containing an incomplete display of the one or more web pages based on the reload priority;
   determining whether a latency of the client device is below a webpage timeout threshold, wherein the webpage timeout threshold is a duration of time that the browser requests a web page for each browser tab before generating a loading error; and
   when the latency of the client device is below the webpage timeout threshold, automatically, without user intervention, reloading, at the client device, the requested content of the one or more browser tabs containing an incomplete display of the one or more web pages based on the determined reload order.

2. The method of claim 1, wherein identifying one or more browser tabs containing an incomplete display of the one or more web pages further comprises:
   detecting a web page timeout for at least one of the browser tabs; and
   displaying, at the client device, an error notification for each of the browser tabs with the web page timeout.

3. The method of claim 2, wherein a latency of the client device higher than the webpage timeout threshold generates the web page timeout.

4. The method of claim 2, wherein the web page timeout terminates a browser session.

5. The method of claim 1, wherein the reload priority is assigned based on a display order of the one or more browser tabs.

6. The method of claim 1, wherein the reload priority is assigned based on a visitation frequency of the one or more webpages.

7. The method of claim 1, wherein the reload priority is assigned based on a size of the one or more webpages.

8. The method of claim 1, wherein the latency of the client device is a measure of time delay of loading the one or more web pages on the browser.

9. The method of claim 1, wherein reloading, at the client device, the requested content of the one or more browser tabs containing an incomplete display of the one or more webpages based on the determined reload order comprises:
   setting the web page timeout threshold for the client device; and
   requesting content for the web page for each of the one or more browser tabs containing the incomplete display of the one or more webpages when the latency of the client device is below the web page timeout threshold, wherein the web page associated with a first browser tab assigned a higher reload priority than a second browser tab is requested first.

10. A non-transitory computer-readable medium storing software comprising instructions executable by one or more computers which, upon execution, cause the one or more computers to perform operations comprising:
    providing a request for content of one or more web pages for display in one or more browser tabs of a browser, wherein each browser tab is associated with a respective webpage;
    assigning a reload priority for each browser tab in response to the request for content of the respective web page;
    receiving the content of the one or more web pages;
    loading the content of the one or more web pages on the browser;
    identifying one or more browser tabs containing an incomplete display of the one or more web pages;
    determining a reload order of the one or more browser tabs containing an incomplete display of the one or more web pages based on the reload priority;
    determining whether a latency of the client device is below a webpage timeout threshold, wherein the webpage timeout threshold is a duration of time that the browser requests a web page for each browser tab before generating a loading error; and
    when the latency of the client device is below the webpage timeout threshold, automatically, without user intervention, reloading the requested content of the one or more browser tabs containing an incomplete display of the one or more web pages based on the determined reload order.

11. The non-transitory computer readable storage medium of claim 10, wherein the instructions cause the processor to further perform:
    detecting the web page timeout for at least one of the browser tabs; and
    displaying, an error notification for each of the browser tabs with the web page timeout.

12. The non-transitory computer readable storage medium of claim 11, wherein a latency of the client device higher than the webpage timeout threshold generates the web page timeout.

13. The non-transitory computer readable storage medium of claim 11, wherein the web page timeout terminates a browser session.

14. The non-transitory computer readable storage medium of claim 10, wherein the reload priority is assigned based on a display order of the one or more browser tabs.

15. The non-transitory computer readable storage medium of claim 10, wherein the reload priority is assigned based on a visitation frequency of the one or more webpages.

16. The non-transitory computer readable storage medium of claim 10, wherein the reload priority is assigned based on a size of the one or more webpages.

17. The non-transitory computer readable storage medium of claim 10, wherein the latency of the client device is a measure of time delay of loading the one or more web pages on the browser.

18. The non-transitory computer readable storage medium of claim 10, wherein the instructions cause the processor to further perform:
  setting the web page timeout threshold for the client device; and
  requesting content for the web page for each of the one or more browser tabs containing the incomplete display of the one or more webpages when the latency of the client device is below the web page timeout threshold, wherein the web page associated with a first browser tab assigned a higher reload priority than a second browser tab is requested first.

19. A system comprising: one or more computers and one or more storage devices storing instructions that are operable, when executed by the one or more computers, to cause the one or more computers to perform operations comprising:
  providing a request for content of one or more web pages for display in one or more browser tabs of a browser, wherein each browser tab is associated with a respective webpage;
  assigning a reload priority for each browser tab in response to the request for content of the respective web page;
  receiving the content of the one or more web pages;
  loading the content of the one or more web pages on the browser;
  identifying one or more browser tabs containing an incomplete display of the one or more web pages;
  determining a reload order of the one or more browser tabs containing an incomplete display of the one or more web pages based on the reload priority;
  determining whether a latency of the client device is below a webpage timeout threshold, wherein the webpage timeout threshold is a duration of time that the browser requests a web page for each browser tab before generating a loading error; and
  when the latency of the client device is below the webpage timeout threshold, automatically, without user intervention, reloading the requested content of the one or more browser tabs containing an incomplete display of the one or more web pages based on the determined reload order.

20. The system of claim 19, wherein the operations further comprise:
  detecting a web page timeout for at least one of the browser tabs; and
  displaying, at the client device, an error notification for each of the browser tabs with the web page timeout.

21. The system of claim 20, where in a latency of the client device higher than the webpage timeout threshold generates the web page timeout.

22. The system of claim 20, wherein the web page timeout terminates a browser session.

23. The system of claim 19, wherein the reload priority is assigned based on a display order of the one or more browser tabs.

24. The system of claim 19, wherein the reload priority is assigned based on a visitation frequency of the one or more webpages.

25. The system of claim 19, wherein the reload priority is assigned based on a size of the one or more webpages.

26. The system of claim 19, wherein the latency of the client device is a measure of time delay of loading the one or more web pages on the browser.

27. The system of claim 19, wherein the operations further comprise:
  setting the web page timeout threshold for the client device; and
  requesting content for the web page for each of the one or more browser tabs containing the incomplete display of the one or more webpages when the latency of the client device is below the web page timeout threshold, wherein the web page associated with a first browser tab assigned a higher reload priority than a second browser tab is requested first.

* * * * *